June 3, 1958 C. C. LAVAL, JR 2,837,042
CEREAL MANUFACTURING DEVICE
Filed Jan. 3, 1956 3 Sheets-Sheet 1

CLAUDE C. LAVAL, JR.
INVENTOR
HUEBNER, BEEHLER,
WORREL & HERZIG
ATTORNEYS

June 3, 1958   C. C. LAVAL, JR   2,837,042
CEREAL MANUFACTURING DEVICE
Filed Jan. 3, 1956   3 Sheets-Sheet 2

CLAUDE C. LAVAL, JR.
INVENTOR
HUEBNER, BEEHLER,
WORREL & HERZIG
ATTORNEYS

June 3, 1958 C. C. LAVAL, JR 2,837,042
CEREAL MANUFACTURING DEVICE
Filed Jan. 3, 1956 3 Sheets-Sheet 3

CLAUDE C. LAVAL, JR.
INVENTOR

HUEBNER, BEEHLER,
WORREL & HERZIG
ATTORNEYS

United States Patent Office 2,837,042
Patented June 3, 1958

2,837,042

CEREAL MANUFACTURING DEVICE

Claude C. Laval, Jr., Fresno, Calif.

Application January 3, 1956, Serial No. 556,932

13 Claims. (Cl. 107—1)

The present invention relates to article handling apparatus for carrying articles from predetermined article loading stations to predetermined article discharge stations. More particularly the invention is concerned with the combination of a plurality of such apparatus and synchronous motivating means therefore whereby distinctive articles are received from separate sources by their respective handling apparatus and joined in predetermined ordered arrangement before discharge from their respective apparatus.

The apparatus of the present invention is excellently suited for use in making composite breakfast cereals and is therefore conveniently described in connection with such employment although adapted to many and varied comparable operations. It is well known to make breakfast cereals from various types of grain in the form of porous or hollow granules, flakes or other particle shapes which are very light in weight. These granules are generally from approximately ¼ to ⅜ inch in diameter and the other particle shapes likewise small and extremely difficult to handle except in bulk. It has been known to treat the particles with sugar and other liquid flavor coatings in order to enhance its taste and sales appeal. For example, cereal particles are frequently immersed in fruit-flavored vegetable matter and subsequently dehydrated for packaging.

However, it has long been a goal of the cereal industry to add particles of dried or otherwise preserved fruits to cereal particles but until the present invention, such efforts have not been successful. It has also long been attempted to add candy pellets and other particles of solid materials to cereals to achieve a composite product. The desirability of such a cereal product is apparent inasmuch as the flavor and nutritional value of the cereal, and the appearance thereof can be improved in such manner and sales thus stimulated.

Prior art methods intended to accomplish the described purpose have included rolling the cereal granules in pellets of candy or fruit. This process has not attained dependable mounting of the pellets on the granules and further has not achieved the requisite uniformity of product. Many cereal granules receive no pellets, a few have excessive numbers of pellets adherent thereto, and even clusters of pellets result without any cereal granules.

Another procedure that has been at least experimentally attempted is to project the pellets onto the granules in an air blast. This procedure has met with failure inasmuch as the cereal granules are so light in weight as to be immediately dispersed by the air blast carrying the pellets. That is, it has not been possible with such a procedure to hold the granules stationary to permit impingement thereon by the pellets. Further, even if the pellets of additives strike the granules it has been impossible to affix the same thereto with sufficient dependability.

Not only has the present invention been successful in achieving the formation of the composite cereals previously believed unattainable but it has proved excellently suited to the production of many other composite materials of small size and has wide application in the intimate joining of many different articles. For example, the apparatus of the present invention is excellently suited to the affixing of pellets of fertilizers, hormones, insectisides, and the like, to seeds; the addition of candy or fruit pellets to cookies or other bakery products; the application of sequins to fabric; the assembling of beads in costume jewelry; and many other operations in which it is desired to join articles from different sources in precise arrangement and number.

Accordingly, an object of the present invention is to provide an improved article handling apparatus for carrying individual articles of relatively small, granular, or pelletized nature, which may be spherical, ellipsoidal, or even of irregular form, from a predetermined article pickup station to a predetermined article discharge station.

Another object is to provide an article handling apparatus for bringing articles form one source into intimate engagement with articles from another source in predetermined ordered arrangement and numerical relationship.

Another object is to provide an apparatus for producing composite articles from separate constituent articles in which at least one of the constituent articles is of small particle size.

Another object is to provide an apparatus as set forth in the foregoing paragraph which is adapted to join the separate constituent articles in predetermined numerical relationship.

Another object is to provide an apparatus for picking up articles from a plurality of separated groups of articles, combining in intimate association the articles of the different groups and discharging such combined articles.

A more specific object is to provide an apparatus of the nature described which enables the joining of a pelletized article, such as preserved fruit, candy pellets, and the like, to cereal granules, flakes, or the dough from which such cereals are made, in dependable association.

Another object is to provide an article handling apparatus of the character described which is simple and economical to make and use, durable, dependable in operation, easy to maintain, adaptable to a variety of work materials, and which is highly effective for accomplishing its intended purposes.

These and other objects will become more fully apparent upon reference to the following description.

Figure 1:
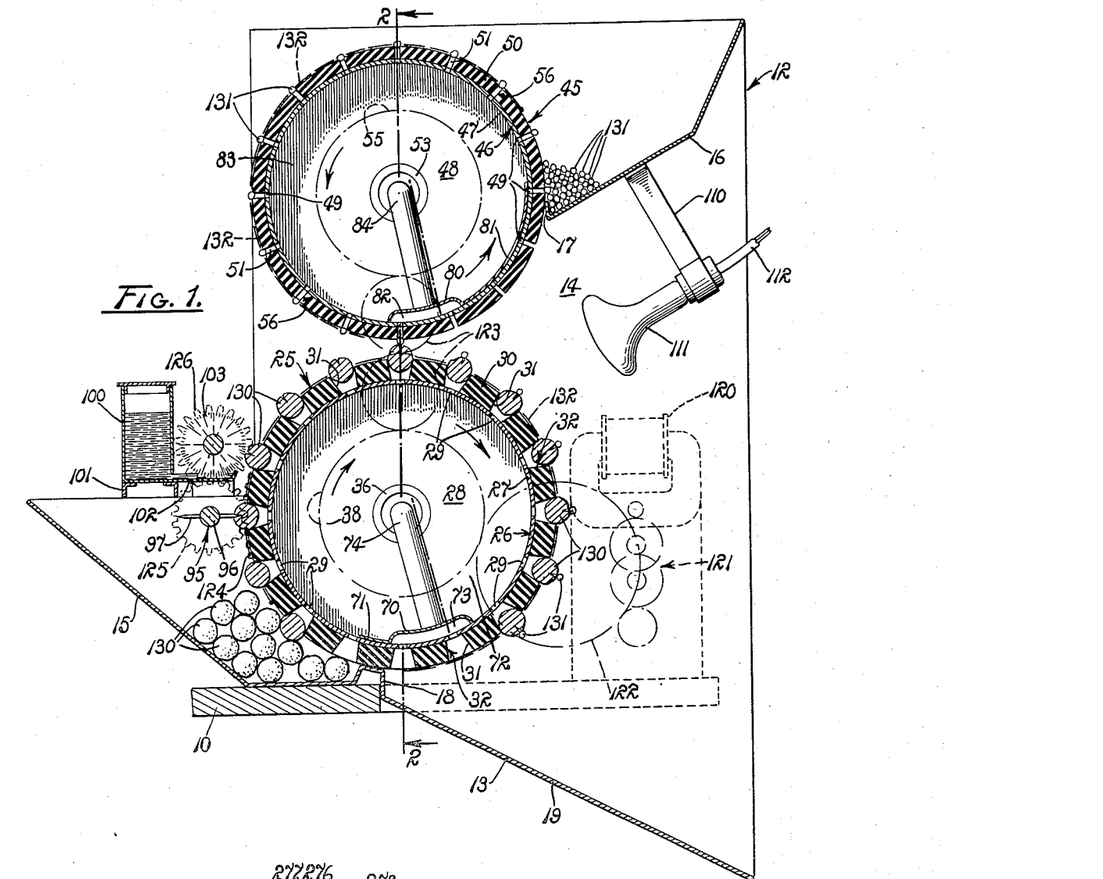
Fig. 1 is an elevational section taken through an apparatus embodying the principles of the present invention.
Figure 2:
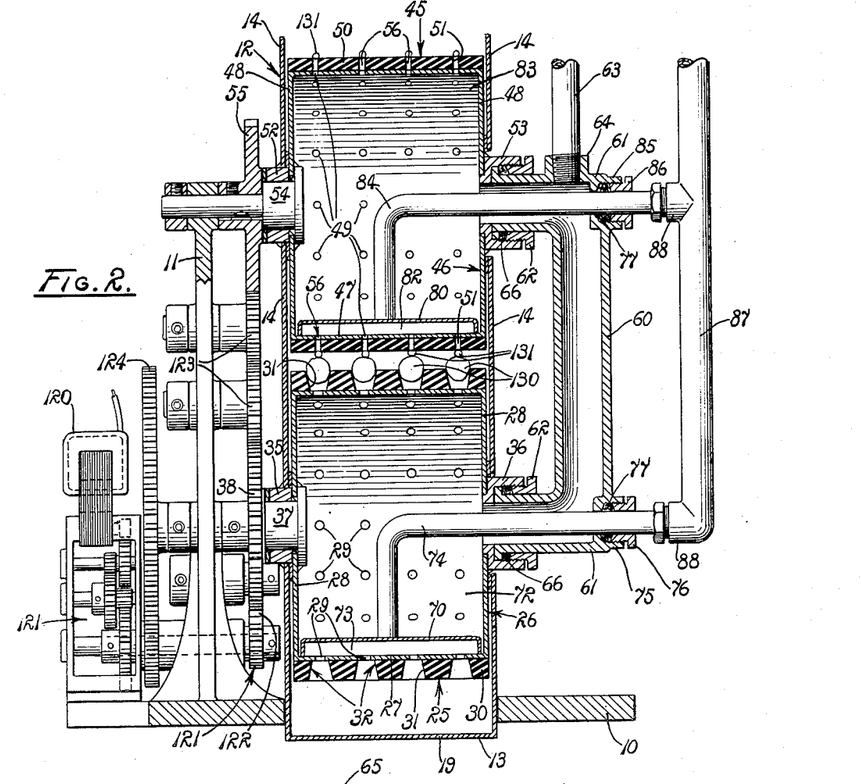
Fig. 2 is a fragmentary elevational section taken on a plane having the position represented by line 2—2 of Fig. 1.

Referring more particularly to the drawings, a substantially horizontal base plate 10 is shown in Figs. 1 and 2. A vertically disposed mounting plate 11, seen in Fig. 2, is secured to the base plate and upwardly extended therefrom. A housing 12 having an upper open end is mounted in the base plate and is best seen in Fig. 1. The housing is conveniently formed of sheet metal, or otherwise constructed, to include a base wall 13, and a pair of upwardly extended substantially parallel side walls 14. The container also includes a lower hopper 15 disposed at one side of the housing, as viewed in Fig. 1, and an upper hopper 16 oppositely disposed from the housing and having an upwardly extended lower lip 17. The base wall has an upwardly disposed U-shaped flange 18, and a sloped discharge chute 19 is downwardly inclined from the flange 18 of the base wall on the opposite side thereof from the lower hopper.

A lower carrier 25 is positioned between the walls 14 of the container 12 and provides an inner drum 26 having a substantially cylindrical wall 27 and a pair of end walls 28. The cylindrical and end walls of the drum define a chamber therewithin and the cylindrical wall provides a plurality of substantially equally spaced orifices 29 communicating with the chamber. The carrier also has a cover 30 of resiliently flexible and compressible material substantially air impervious material, such as foam rubber, circumferentially secured to the drum, as by vulcanizing or cementing the same thereto, and preferably providing outwardly enlarged, substantially frusto-conical pockets 31 having axes radially disposed relative to the drums and individually registering with the orifices in the drum. The orifices and the pocket constitute passages 32 for passage of air into and out of the carrier.

A bearing sleeve 35 is mounted in one of the container walls 14 and a female bearing socket member 36 is rotatably mounted in the other wall 14 in axial alignment with the bearing sleeve. One of the end walls 28 of the lower carrier 25 is secured concentrically to the socket member, and a shaft 37 is secured concentrically to the other carrier end wall rotatably extended through the sleeve 35 outwardly of the housing 12. The carrier is thus mounted within the container for rotation about a substantially horizontal axis adjacent to the lower hopper 15 and the discharge chute 19, and has a periphery closely adjacent to the flange 18. During rotation of the carrier the periphery thereof travels in such closely adjacent relation to the flange 18 that the lower hopper is effectively separated from the chute. A spur gear 38 is secured concentrically to the drive shaft 37 for the carrier.

An upper carrier 45 is constructed in a manner similar to the lower carrier 25 and is positioned between the container walls 14 above the lower carrier. Thus the upper carrier provides an inner drum 46 including a substantially cylindrical wall 47 and end walls 48 having orifices 49 in the cylindrical wall and defining a chamber therewithin. A cover 50 of resiliently flexible and compressible material is secured to the cylindrical wall and provides a plurality of radially extended pockets 51 individually communicating with the orifices in the drum. The upper carrier has a periphery in closely adjacent proximity to the lip 17 thereby to close the upper hopper at its lower end.

A bearing sleeve 52 is provided in one of the walls 14 of the housing 12, and a female bearing socket member 53 is axially aligned with the sleeve and rotatably mounted in the other end wall 14. A drive shaft 54 is rotatably extended through the bearing sleeve and connected concentrically to the upper carrier, and a spur gear 55 is mounted on the drive shaft. It is to be noted that the orifices 49 and pockets 51 constituting passages 56 are of somewhat smaller diameter than the passages 32 of the lower carrier 25. Depending upon the size of articles to be carried, such passages may be changed to any suitable dimensions, and it is therefore possible that the upper and lower carriers may be identical in construction for certain purposes. As noted, the passages 32 are substantially equally spaced about the carrier 25. For purposes soon to become apparent, the passages 56 are spaced a substantially equal amount about the carrier 45.

The upper and lower carriers 45 and 25 are therefore mounted for rotation around substantially parallel axes having peripheries in closely adjacent spaced relation so that the distance between their axes is just slightly greater than the sum of their radii, as will be evident in the drawings. For descriptive convenience, the pockets 31 and 51 of the carriers are assumed to travel in predetermined paths of revolution concentric to their respective carrier axes from article loading or pickup stations defined by their respectively adjacent hoppers 15 and 16, to article releasing or discharge stations, and return. While both of the carriers are shown to be cylindrical, it will be apparent that other forms of endless carriers are suitable to the purpose. The article discharge station of the lower carrier is at the discharge chute 19. The article discharge station of the upper carrier is located adjacent to the periphery of the lower carrier intermediate the article pickup and discharge stations of the lower carrier. More specifically, the discharge station of each pocket of the upper carrier lies in a plane common to the axes of rotation of the carrier.

An air duct 60 provides spaced elbow portions 61 extended into the female bearing socket members 36 and 54. Packing nuts 62 are fitted around the elbow portions and threadedly received within the socket members. The elbow portions are preferably endwardly flanged thereby to maintain the air conducting member dependably in position and in communicating relation with the chambers of the carriers. A suction conduit 63 is threadably fitted in a connection 64 in the duct and is adapted for coupling to the input side of an air pump 65, the latter being diagrammatically represented in Fig. 3. To minimize air leakage, packing 6 is provided between the nuts 62 and the end flanges of the elbow portions.

An arcuate manifold 70 is mounted in the chamber of the lower carrier 25 in slidable substantially air tight engagement with the cylindrical wall 27 thereof and includes an extended plate 71 likewise slidably engageable with the cylindrical wall in the direction of carrier rotation. The manifold divides the chamber into a suction compartment 72 externally of the manifold but interiorly of the carrier and a pressure compartment 73 interiorly of the manifold which are successively in communication with the passages 32. The suction compartment extends from the article pickup station, as defined by the hopper 15 to, but not including, the article discharge station. The article discharge station is spanned by the pressure compartment, and the engagement of the manifold with the cylindrical wall 27 is such as to isolate the compartments and substantially to maintain their individual air-tight integrity. An elongated L-shaped pressure conduit 74 is connected to the manifold and provides a portion axially extended from the lower carrier through the female bearing socket member 36, the adjacent elbow portion 61 of the air conductor 60, and through a bearing 75 in the air conductor a packing nut 76 is fitted around the pressure conduit and threaded into the bearing 75. Packing 77 is provided to effect the desired seal.

Figures 3, 4:
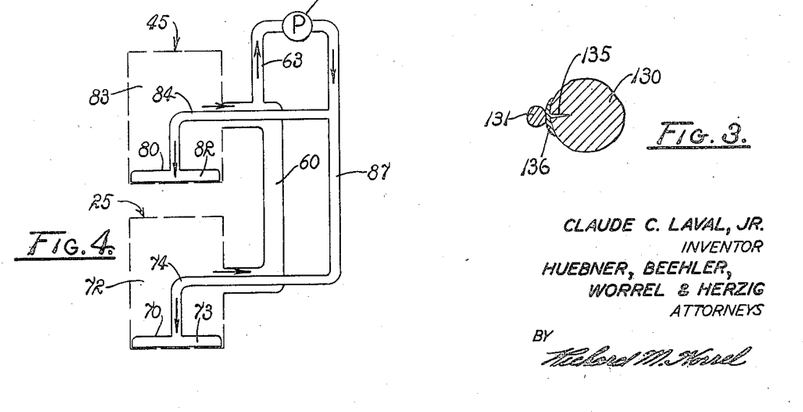
Fig. 3 is a somewhat enlarged view of a cereal granule having a pellet of preserved fruit, candy, or the like attached thereto in the manner accomplished by the apparatus of the present invention.
Fig. 4 is a schematic diagram of a pneumatic system employed with the present invention.

A similar arcuate manifold 80 is mounted in the chamber of the upper carrier 45 and has an arcuate plate 81 generally extended therefrom upwardly beyond the lip 17 of the upper hopper 16. The manifold 80 also divides the upper chamber into isolated substantially air-tight pressure and suction compartments 82 and 83, respectively. It will be noted that the suction compartment extends from the upper hopper 16 up to the discharge station while the latter is embraced by the pressure compartment. An L-shaped pressure conduit 84 is connected to the upper manifold 80 and provides a portion axially extended through the bearing socket 54, and through a bearing 85 in the conductor 60. A packing nut 86 is provided around the conduit 84 and threaded into the bearing 85 to hold packing 77 therein under compression. A main pressure conduit 87 provides a pair of connectors 88 individually connected to the pressure conduits 74 and 84 and has an extended end connected to the outlet of the pump 65, as seen in Fig. 4.

A rotary pricking device 95 is optionally provided having a shaft 96 rotatably mounted in the lower hopper 15 around an axis substantially parallel to the carrier axes and adjacent to the periphery of the lower carrier 25. The pricking device has a plurality of rows of radially extended pricking members 97 having sharpened ends for a purpose to be described.

A fluid reservoir 100 is mounted on suitable brackets 101 on the lower hopper 15. The reservoir is adapted to contain a quantity of a liquid binding material and has a dispensing chute 102 adapted to hold a small amount of the binding material metered downwardly from the reservoir. An elongated applying brush wheel 103 is mounted in any convenient manner on the container 12 above the reservoir chute for rotation about an axis parallel to the carrier axes and adjacent to the periphery of the lower carrier 25. Additionally, the applying wheel is located above the pricking device 95 and, in relation to the lower carrier, is peripherally spaced from the pricking wheel circumferentially of the lower carrier in the predetermined direction of rotation thereof, as will be seen.

A bracket 110 of any convenient form is downwardly extended from the upper hopper 16 and mounts a lamp 111 therein, preferably having a light output of high heat content, such as an infra-red lamp. A cord 112 is connected to the lamp for energization thereof.

An electric motor 120 provides an output shaft connected to a gear train generally indicated at 121. A main reach gear 122 is mounted for rotation in the mounting plate 11 and is in mesh with the train gear 121 and the spur gear 35 for the lower carrier 25. Further, a pair of intermediate reach gears 123 are rotatably mounted on the mounting plate and extend from the lower spur gear to the upper spur gear 55. The intermediate reach gears thus provide driving connection between the upper and lower carriers. In addition, a ring gear 124 is mounted on the shaft 37 of the lower carrier and is in mesh with a pinion gear 125 (Fig. 1) on the pricking device 95 to afford drive for the latter. It is to be noted that the rows of pricking members 97 are successively aligned with the passages 32 of the lower carrier and for this purpose it may be stated that the pricking device rotates 180 degrees for an increment of rotation of the lower carrier equal to the angle between centers of adjacent passages. The pinion gear on the pricking device in turn drives a cog 126 on the applying wheel 103. It will be evident that this driving arrangement synchronizes rotation of the upper and lower carriers, the pricking device, and the applying wheel. The arrangement is such that the axes of passages 32 of the lower carrier 25 are successively brought into alignment with axes of corresponding passages of the upper carrier 45 with such aligned passage in opposed facing relation.

Operation

The operation of the above described embodiment of the present invention is believed to be readily apparent and is briefly illustrated at this point. A quantity of cereal granules, constituting a first group of articles, and generally indicated by the numeral 130 is placed in the lower hopper 15. A quantity of pellets of candy or fruit 131, constituting a second group of articles, is placed in the upper hopper 16.

The pump 65 is energized to draw air outwardly from the suction compartments 72 and 83 of the upper and lower carriers 45 and 25 and to blow air inwardly into the pressure compartments 73 and 82. The cord 112 is connected to a suitable source of electrical energy to energize the lamp 111. The motor 120 is then started to impart rotatable movement to the carriers, the pricking device 95 and the applying wheel 103. As above noted, the pockets 31 and 51 move from article pickup stations to article discharge stations. As soon as suction is applied to the suction compartments, granules 130 are drawn into the pockets 31 adjacent to the lower hopper 15, and pellets 131 are drawn into the pockets 51 adjacent to the upper hopper 16. In order to maintain the vacuum in the suction compartments during initial operation of the apparatus and prior to filling of the pockets with articles to be carried, flexible sheet members, indicated in dash lines at 132 in Fig. 1, are placed over the empty pockets 31 and 51. It will be understood, however, that such sheet members are only a temporary expedient and are entirely removed after the carriers have made a complete rotation.

In drawing granules 130, or pellets 131, into the pockets 31, or 51, the sheet material of the covers 30, or 50, puckers around the granules, or pellets, in substantially airtight engagement therewith to retain the granules, or pellets, therein and to minimize air loss. This is advantageous in effecting a conveyance of articles from one place to another but is especially significant in the present invention since it enables holding of the granules, or articles, of irregular size and shape dependably against the peripheries of the carriers. Although the cereal granules are illustrated as uniform and symmetrical, it will be appreciated that wide ranges of sizes and shapes are encountered. It should also be observed that while the pellets 130 are described as being drawn into the pockets, it is adequate if they are held thereagainst.

The lower carrier 25 is conveniently adapted to rotate in a clockwise direction, as viewed in Fig. 1. Thus granules 130 picked up by the carrier travel upwardly and are individually pierced by the pricking device 95 to provide perforations, as 135, therein. Further upward movement of the rows of granules brings the granules into contact with the brushing wheel 103 thereby to apply a small quantity of liquid bonding agent, as 136, thereto. The bonding agent, such as sugar water, albumin or the like flows into the perforation to provide a dependable anchoring means in the granule, upon hardening. It is to be understood, however, that the bonding agent temporarily remains in a semi-fluid or molten state as the carrier continues to rotate.

As the lower carrier 25 rotates further, the rows of granules 130 having perforations 135 and deposits of bonding agent 136 thereon are brought into adjacent spaced relation to the periphery of the upper carrier 45. Of course, rotation of the lower carrier 25 is transmitted to the upper carrier so that the pellets 131 picked up by the upper carrier are carried in a counter-clockwise direction, as viewed in Fig. 1, and are likewise brought into adjacent closely spaced relation to the lower carrier. As above explained, the carriers are synchronized so that corresponding rows of pockets 31 and 51 are successively brought into juxtaposition with their axes in alignment. Thus, when each row of pellets 131 moves from a position with its associated pockets in communication with the suction compartment 83 of the upper carrier into a position with its pockets in communication with the pressure compartment 82 of the upper carrier, such pellets are blown generally radially outwardly to impinge against the opposed adjacent granules 130 held by the lower carrier. The pellets are adapted to strike the granules in the areas thereof coated with bonding agent 136 so as to adhere thereto. Obviously, by controlling the air pressure, the pellets may be made to strike the granules with considerable force. With the employment of approximately uniform pellets and granules, the machine is constructed so that the distance of the travel of the pellets is negligible, their paths of travel kissing at the point of pellet release.

Continued rotation of the lower carrier 25 brings the rows of combined granules 130 and pellets 131 into the rays of the drying lamp 111 thereby to facilitate hardening of the bonding agent. Finally, the joined articles revolve past the discharge station where the pockets 31 communicate with the pressure compartment 73 of the lower carrier whereupon the combined articles are blown outwardly from the lower carrier onto the discharge chute 19 for collection in any desirable manner.

In the meantime, the empty pockets 51 in the upper carrier 45 travel past the plate 81 upwardly toward the upper hopper 16 to again pick up pellets 131 to be carried in the manner described. Likewise, the empty pockets 31 in the lower carrier 25 move past the flange 18 into the pickup station defined by the lower hopper 15 again to draw in cereal granules 130.

As will be apparent, the pockets 31 and 51 are of such size as to preclude passage of articles 130 and 131, respectively therethrough. In this regard and when the size or dimensions of pockets or passages are referred to in the claims, it is to be understood that all that is necessary and intended is that the pockets or passages have sufficient constriction or transverse dimension to prevent movement of articles therethrough. It is thus possible and preferable, as with pockets 31, that articles fit partially, or wholly, within the pockets. On the other hand, an article may be of such size and shape that it will not even enter the pocket to any appreciable extent but merely be drawn against the carrier in overlaying relation to the pocket.

Second form

Figures 5, 6:
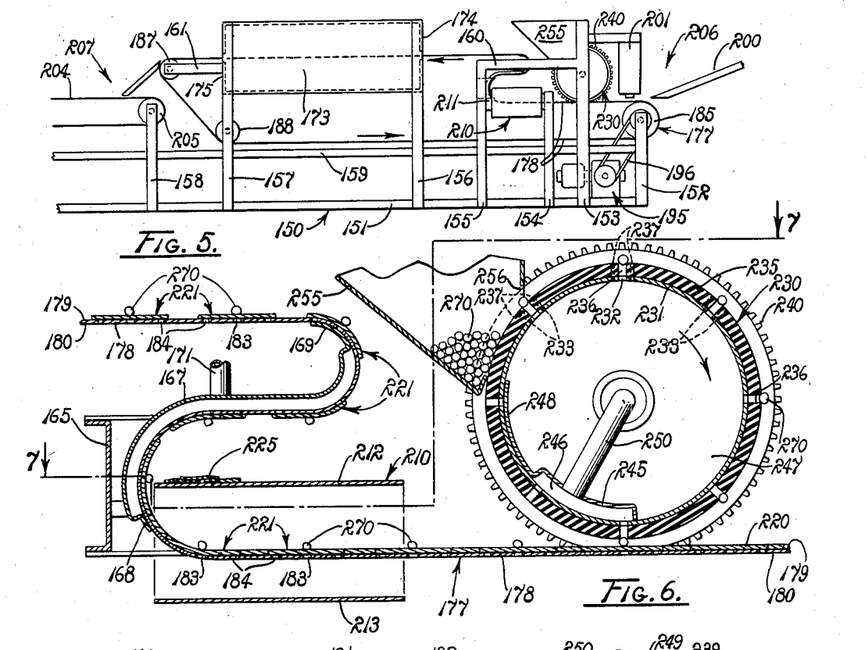
Fig. 5 is a side elevation of a second form of the present invention.
Fig. 6 is a fragmentary somewhat enlarged elevational section of a portion of the device of Fig. 5.
Figure 7:
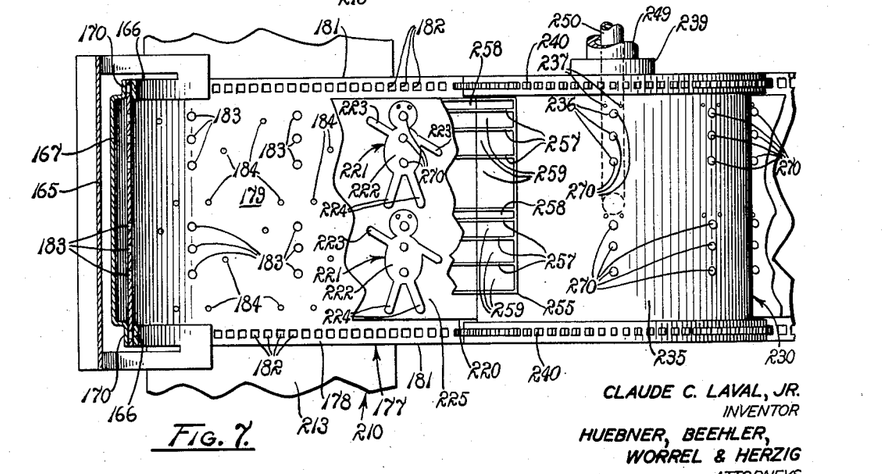
Fig. 7 is a fragmentary somewhat enlarged plan view, with portions of the structure broken away, of the structure shown in Fig. 6, as taken on line 7—7 of Fig. 6.

A second form of the present invention is shown in Figs. 5, 6 and 7 and provides a frame 150 having a base 151 and a plurality of posts 152, 153, 154, 155, 156, 157 and 158 upstanding from the base. A longitudinal brace 159 interconnects the upstanding posts, a connecting member 160 interconnects the posts 155 and 153 upwardly spaced from the longitudinal brace, and a strut 161 is extended from the post 157 toward the post 158. The posts 152 and 158 are at forward and rearward ends, respectively, of the frame so designated for ease of understanding the following description.

A mounting bracket 165, best seen in Figs. 6 and 7, is secured to the post 155 and includes a pair of spaced generally S-shaped arms 166 in upwardly disposed positions and forwardly extended from the post 155. A generally S-shaped suction head 167 is mounted on the bracket 165 and provides a pair of end flanges 168 and 169 and a pair of lateral flanges 170 in rearwardly adjacent spaced relation to the arms of the bracket. A suction conduit 171 connects the suction head to any suitable source of vacuum, not shown. An enclosed oven 173 is mounted between the posts 156 and 157 and has forward and rearward open ends 174 and 175.

A lower carrier 177 provides an endless flexible sheet 178 having top and bottom surfaces 179 and 180, opposite edges 181, perforations 182 along the edges, and a plurality of apertures 183 and 184 in predetermined positions therein best illustrated in Fig. 7 and more fully explained hereinafter. The flexible sheet has upper and lower runs respectively moving in rearward and forward directions and is mounted for movement in a circuitous path of travel on a pulley 185 secured to post 152, a pulley 187 secured to the extended strut 161, and a pulley 188 secured to the post 157. The edges 181 of the flexible sheet are fitted between the arms 166 of the mounting bracket 165 and the lateral flanges 170 of the suction head 167 for slidable travel therebetween and so that the apertures in the sheet are in communication with the suction head. The sheet travels through the oven 173, entering the forward end 174 and leaving by the rearward end 175. A prime mover 195, such as an electric motor, is mounted on the base 151 and is in driving connection with the pulley 185 by means of a belt 196 for imparting movement to the lower carrier.

An article delivery conveyor 200 is mounted in adjacent endwardly spaced relation to the forward end of the frame 150 for delivering work material, to be described, to the lower carrier 177. A cutter 201 of any suitable construction is also mounted at the forward end of the frame above the lower carrier and adjacent to the delivery carrier. A discharge conveyor 204 is mounted on a pulley 205 secured to the post 158 at the rearward end of the frame. The lower carrier thus moves rearwardly from an article receiving or loading station, generally indicated at 206, in an horizontal position with the top surface 179 upwardly disposed, thence through the bracket 165 upwardly and forwardly into a horizontal position with the top surface downwardly disposed, thence upwardly and rearwardly with the top surface again upwardly disposed for passage through the oven 173 to a discharging or depositing station, generally indicated at 207, and for subsequent return to the loading station.

A residue conveyor 210 is mounted on bearings 211 secured to the posts 154 and 155 of the frame 150 and provides upper and lower runs 212 and 213 transverse to the lower carrier 177 and being respectively above and below the lower carrier at a position forwardly of the mounting bracket 165. The arrangement is such that the top surface 179 of the flexible sheet 178 of the lower carrier passes in inverted position above the upper run of the residue conveyor during its travel from the loading to the discharging station.

A sheet of soft, pliable work material, such as dough, is delivered by the conveyor 200 to the lower carrier 177. Figured cookies 221, or the like pastry article, are stamped or cut out of the dough by the cutter 201 to form body portions 222, arms 223, and legs 224 and to leave thereby a residue 225 of dough. It is to be noted that the cutter is located in such a position that the cookies it cuts out of the dough lie over the apertures 183 and 184 of the flexible sheet 178 for a reason soon to be apparent. In the embodiment illustrated, the bodies 222 of the cookies are over the apertures 183 and the arms and legs are over the apertures 184. Obviously, other shapes, pastries, or like articles may be stamped from the dough, or other work material, and if so, the apertures are located in corresponding desired juxtaposition to the cut-out articles.

An upper carrier 230 is provided and is substantially identical to the carriers 25 or 45 of the first form of the invention. Briefly, therefore, the upper carrier 230 provides a cylindrical interior wall 231 having a plurality of orifices 232 and 233. The orifices 232 are longitudinally aligned in separate groups of threes in the illustrated embodiment. These groups are further arranged in a plurality of longitudinally aligned rows and the rows are substantially equally peripherally spaced about the carrier with corresponding orifices in each row lying in common planes transversely of the carrier. A pair of orifices 233 is disposed on opposite sides of each group of orifices 232 at an end of each group and corresponding pairs of orifices 233 are in common planes transversely of the carrier. As will be seen, however, the described arrangement of the orifices only serves to illustrate one embodiment of the invention which is by no means limited thereto. The carrier also has an outer cover 235 of resiliently flexible and compressible material having a plurality of pockets 236 and 237 respectively in registration with the orifices 232 and 233. The upper carrier is mounted in peripherally adjacent spaced relation to the lower carrier 177 above the position at which the top surface 179 of the flexible sheet 178 is upwardly disposed in substantially horizontal position. The carrier is supported on bearings, as 239, rotatably mounted in the frame 150 on posts 152 for rotation of the carrier on an axis concentric to the wall 231. Ring gears 240 on the carrier are in mesh with the perforations 182 of the flexible sheet to impart rotation to the upper carrier incident to travel of the lower carrier and thereby to synchronize movements of the carriers.

The upper carrier 230 has an internal chamber in which is located a manifold 245 dividing the chamber into a pressure compartment 246 and a suction compartment 247. The manifold has flanges 248 extended therefrom and fitted to the interior wall 231. A stationary suction conduit 249 is rotatably extended through a bearing 239 into the upper carrier in communication with the suction compartment, and a stationary pressure conduit 250 is extended through the suction conduit into the chamber and is connected to the manifold.

An upper hopper 255 is mounted on the post 153 and connecting member 160 of the frame 150 above the upper carrier 230 and provides an outlet opening 256 peripherally adjacent to the upper carrier. A plurality of partitions 257 divide the upper hopper into a plurality of sections 258 and 259. The sections 258 are in substantially vertical planes transversely of the upper carrier 230 coincident with corresponding transversely aligned pairs of orifices 233 while the sections 259 are respectively in planes coincident with the orifices 232, as best seen in Fig. 7.

Operation of second form

The operation of the second form of the present invention is believed to be readily apparent and is briefly summarized at this point. The hopper sections 258 and 259 are initially filled with articles 270, which, for example, may be candy pellets of various sizes, shapes and colors to simulate eyes, noses, buttons, and the like, of the figured cookie 221 stamped out of a sheet of dough 220. Air is then applied under pressure to the chamber 246 and air withdrawn from the chamber 247 in a manner similar to that described in the first form of the invention and likewise air is withdrawn from the suction conduit 171 for the lower carrier 177 to provide a partial vacuum in the head 167. The oven 173 is heated, and the delivery and discharge conveyors 200 and 204 are started. The prime mover 195 is then energized to motivate the lower carrier thereby synchronously to drive the upper carrier 230 by means of the perforations 182 engaging the ring gears 240.

Initially a sheet of substantially air impervious material, not shown, is placed over the upper carrier 230 to maintain suction initially before any candy articles 270 have been drawn into the pockets 236 and 237 of the upper carrier. A sheet of dough 220 is fed from the delivery carrier 200 to the lower carrier 177 and the cutter 201 activated successively to stamp out figured cookies 221 from the dough.

The pellets of candy 270 are respectively drawn into the pockets 236 and 237 from the upper hopper 255 as the upper carrier 230 rotates. Obviously the hopper may be divided to contain pellets of different colors or other distinguishing characteristics. These articles are thus carried in paths of travel from an article pickup station at the upper hopper where the pockets are in communication with the suction compartment 247 to a lower releasing station in communication with the pressure compartment 246 where they are blown outwardly from the upper carrier to impinge the cookies on the lower carrier 177. As before, the pockets are in communication with the suction compartment from the pickup to the releasing station. Because of the predisposition of the carrier orifices 232 and 233 and pockets 236 and 237, and the cookies 221 on the lower carrier, the pellets 270 are blown from pockets 237 into eye positions on the cookie bodies 222, and from pockets 236 into nose positions and button positions on the cookie bodies. Because of the soft penetrable condition of the dough, the pellets are partially embedded in the dough. Here again, the travel of the pellets from the upper carrier is negligible, the blowing release simply serving to press the pellets against the dough.

Continued travel of the lower carrier 177 moves the cookies 221 and attached candy articles 270 along the arms 166 of the mounting bracket 165 until the top surface 179 is downwardly disposed above the residue conveyor 210. As the lower carrier travels along the mounting bracket, the apertures 183 and 184 communicate with the suction head 167. Since these apertures are against the body 222, arms 223 and legs 224 of the cookies, the latter are drawn against the lower carrier as the carrier moves the sheet of dough 220 into an inverted position. However, the residue 225 of dough which remains after the cookies are stamped from the sheet 220 falls downwardly onto the upper run 212 of the residue conveyor since there is no suction applied to this residue. Further movement of the lower carrier again brings the cookies 221 and attached candy pellets 270 into an upper horizontal position where they travel through the oven 173 and eventually are discharged onto the conveyor 204 for further processing, packaging, or the like. As previously noted, this form of the invention also is not limited to the attaching of candy pellets to figured cookies but has use in joining many articles of similar nature.

Third form

Figure 8:
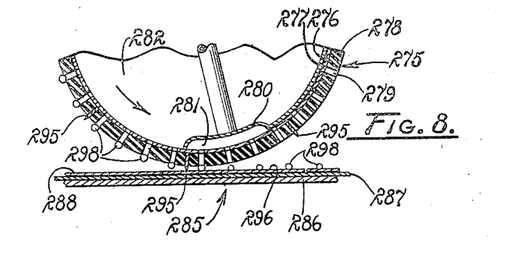
Fig. 8 is a fragmentary elevational section of a further form of the present invention.

The third form of the present invention is shown fragmentarily in Fig. 8, and includes an upper carrier 275 having a construction similar to the carriers 25, 45 and 230. Thus it has an internal wall 276 providing orifices 277 and an outer cover 278 of resiliently flexible material having a plurality of pockets 279 in registration with the orifices. A manifold 280 is mounted in the carrier and divides the carrier into pressure and vacuum compartments 281 and 282.

A lower carrier 285 provides a rigid support 286 over which travels a flexible sheet 287 having an upper surface adapted to carry a sheet of soft, pliable work material 288, such as dough or the like.

The upper carrier 275 mounts a plurality of laterally extended peripherally disposed knife blades 295 adapted to engage and cut the dough 288 on the lower carrier 285 into a plurality of segments 296. The upper carrier 275 is adapted to carry a plurality of pellets 298, such as preserved fruit, or like articles, in the pockets 279 in a manner above described and now believed to be well understood.

In use, the device of the third form of the invention is excellently suited for forming corn flakes and for applying pellets of fruit or the like to the flakes prior to hardening. Thus, both of the carriers 275 and 285 are motivated, pellets 298 delivered to the upper carrier and a sheet of soft corn flake dough 288 delivered to the lower carrier. As the pellets are moved into communication with the pressure compartment 281 they are blown against and partially onto the dough, as before. Further, as the knife blades 295 engage the dough they cut it into small flakes or segments 296 each of which receives a predetermined number of pellets. Subsequently, the flakes are passed through driers and hardened with the pellets firmly attached thereto.

From the foregoing it will be evident that several very advantageous devices have been provided for carrying articles from predetermined loading to predetermined releasing stations. The described resilient covers of the carriers enables the concurrent carrying of a plurality of articles of somewhat varied sizes and shapes and is thus excellently suited for use in the described manner. The invention has been highly successful for attaching pellets of candy or fruit to cereal granules, pastries, and the like, but is obviously adapted to many other uses. The invention is highly effective for accomplishing its intended functions.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In an article handling apparatus, the combination of an article carrying member having an inner surface, an outer resiliently flexible and compressible surface, and a passage extended therethrough between the inner and outer surfaces for receiving an article to be carried, said passage having a minimum transverse dimension less than that of the articles to be handled so as to prevent movement of the article entirely through the passage; and means adjacent to the inner surface of the carrying member drawing air inwardly through the passage whereby an article is drawn against the outer surface of the carrying member in overlaying relation to the passage and whereby the material of the carrying member about the passage puckers inwardly about the article to retain the article and minimize air loss.

2. In an article handling apparatus, the combination of an endless carrier comprising a backing member of substantially air impervious material having orifices therein, and a sheet of resiliently flexible and compressible material mounted on the backing member having pockets therein in pneumatic communication with the orifices adapted to receive articles to be carried thereby, the pockets having portions of transverse dimensions less than the articles to be handled to preclude passage of the articles through the pockets; and means for drawing air inwardly through the orifices and thus inwardly through the pockets whereby such articles are drawn into the pockets and the sheet material about the pockets is puckered inwardly about the articles to retain the articles and to minimize air loss.

3. In an article handling apparatus, the combination of an endless carrier having an inner surface, an outer resiliently flexible and compressible surface, and a passage extended therethrough between the inner and outer surfaces for receiving an article to be carried, said passage being of a size smaller than the articles to be handled to preclude the movement of articles therethrough; means motivating the carrier in a predetermined course of travel from an article pickup station to an article discharge station, and return; and means adjacent to the inner surface of the carrier blowing air outwardly through the passage at the article discharge station and applying a vacuum to the passage at the pickup station and throughout the course of travel of the carrier from the pickup station ot the discharge station.

4. An article handling apparatus comprising an endless support member providing a material handling side and an opposite side, said support member having a plurality of orifices therein, a sheet of resiliently flexible and compressible material mounted on the material handling side of the support member having pockets therein for receiving articles to be carried, the pockets having connection to the orifices for passage of air through the connected pockets and orifices, said pockets being of a size smaller than the articles to be handled to preclude the passage of the articles through the pockets, driving means motivating the support member through a predetermined course of travel from a predetermined loading station to a releasing station, and return, and means operably associated with said opposite side of the support member blowing air outwardly through the orifices at the releasing station and applying a vacuum to the orifices at the loading station and throughout the course of travel of the orifices from the loading station to the releasing station.

5. An article handling apparatus comprising a carrying member having an outer sheet of elastic resiliently compressible material, the carrying member circumscribing an enclosed chamber and having an article receiving pocket in the sheet in communication with said chamber, said pocket being of a transverse dimension less than that of the articles to be handled to preclude passage of the article therethrough, partitioning means in the chamber in slidable substantially air-tight engagement with the carrying members dividing the chamber into a suction compartment and a pressure compartment, means mounting the carrying member for motivation in a circuitous path of travel from an article pickup station wherein the pocket is in communication with the suction compartment thereby to enable drawing of an article into the pocket with the elastic resiliently compressible material puckered therearound to an article release station wherein the air passage is in communication with the pressure compartment to release an article carried in the pocket, and means connected to the compartments applying a vacuum to the suction compartment and a pressure to the pressure compartment.

6. An article handling apparatus comprising a rotary carrier having an enclosed internal chamber circumscribed by an inner substantially cylindrical wall having orifices therein and an outer resiliently compressible sheet having enlarged pockets in registry with the orifices for passage of air through registering pockets and orifices between the chamber and the exterior of the carrier, the pockets being adapted to receive articles to be carried and being smaller in size than such articles to preclude their passage into the pockets, means mounting the carrier for rotation around an axis concentric to the carrier wall, stationary partitioning means mounted in said chamber in slidably fitted engagement with the carrier dividing the chamber into isolated substantially air-tight suction and pressure compartments, and air pump means having an air inlet connected to the suction compartment and air outlet connected to the pressure compartment, the registered orifices and pockets being successively in communication with said suction compartment to draw articles into the pockets and with said air pressure compartment to discharge articles from the pockets during rotation of the carrier.

7. In an article handling apparatus, the combination of a first endless carrier having an inner surface, an outer sheet of resiliently flexible and compressible material, and passages extended therethrough adapted to receive articles of a first group of articles to be carried, the passages being of transverse dimensions less than the transverse dimensions of the articles of said first group to preclude their movement through the passages; means motivating the first carrier in a predetermined path of travel from an article loading station to an article releasing station, and return; means adjacent to the inner surface of the carrier drawing air inwardly through the passages at the article loading station and during travel of the carrier from the loading station to the article releasing station to draw articles of said first group of articles into the passages and to carry them to the article releasing station; means adjacent to the inner surface of the carrier blowing air outwardly through the passages at the releasing station to release articles from the first carrier; a second endless carrier; means motivating the second carrier in a predetermined course of travel from an article receiving station past the article releasing station of the first carrier to an article discharging station, and return, said second carrier being adapted to carry articles of a second group of articles past the releasing station of the first carrier for engagement of the articles from said second group of articles by articles of said first group of articles released from the first carrier.

8. In an article handling apparatus, the combination of a pair of carriers having endless support members providing material handling sides and opposite sides and a plurality of orifices therein, the carriers further having peripheral sheets of resiliently flexible and compressible material mounted on the material handling sides of their respective support members providing article receiving pockets therein in pneumatic communication with the orifices in their respective support members, the pockets being of a size to preclude the passage of articles therethrough; means mounting the carriers in peripherally adjacent spaced relation for movement in independent predetermined paths of travel; driving means synchronously motivating the carriers through said paths of travel from separate predetermined loading stations to separate predetermined releasing stations, and return, the releasing station for one of the carriers being adjacent to the path of travel of the other carrier and being intermediate the loading and releasing stations for said other carrier; and means adjacent to said opposite side of the support members blowing air outwardly through the orifices at the releasing stations and applying a vacuum to the orifices at the loading stations and throughout the paths of travel of the orifices from the loading stations to the releasing stations of their respective carriers.

9. An article handling apparatus comprising a pair of rotary carriers having internal chambers circumscribed by inner substantially cylindrical walls provided with orifices and outer resiliently compressible sheets circumscribing their respective walls provided with pockets in individual registry with the orifices in their respective walls and larger than the orifices for passage of air therethrough, the pockets being adapted to receive articles to be handled and being smaller than the articles; stationary partitioning means mounted in the chamber of the carriers in slidably fitted engagement with the inner walls and dividing the chambers into substantially air-tight suction and pressure compartments, means mounting the carriers in peripherally adjacent spaced relation for rotation on spaced substantially parallel axes of rotation for movement of the pockets in paths of revolution concentric to the axes of their respective carriers from article loading stations where the pockets are in communication with their respective suction compartments to article releasing stations where the pockets are in communication with their respective pressure compartments, and return, the pockets remaining in communication with their respective suction compartments during their movement from their respective loading stations to their respective releasing stations; powered means synchronously rotating the carriers to bring the pockets successively into opposed facing relation at the releasing station of the pockets of one carrier and intermediate the loading and releasing stations of the pockets of the other carrier; means supplying articles to the carriers at the loading stations thereof; and pump means having an inlet connected to said suction compartments and an outlet connected to said pressure compartments.

10. An apparatus for intimately joining a pair of articles comprising a pair of hollow carrying members having substantially circular peripheries providing air passages therein, individual supply means containing articles to be joined positioned adjacent to the peripheries of the carrying members, suction means connected to the carrying members in communication with the air passages to draw articles from the supply means against the peripheries of the carrying members, the passages being respectively smaller than the articles carried by their carrying members, means mounting the carrying members for rotation around spaced substantially parallel axes with the peripheries of said members in closely adjacent spaced relation, means connected to the carrying members synchronously rotating the carrying members in predetermined directions of rotation to bring their air passages and articles drawn against the carrying members into opposed facing relation, means mounted adjacent to one of the carrying members for applying a bonding agent to an article drawn against the periphery thereof, stationary pressure means mounted in one of the carrying members for blowing air outwardly of the air passage in such member as it travels into opposed facing relation with the air passage in the other carrying member for blowing an article carried thereby against an article held by the other carrying member, and stationary pressure means mounted in the other carrying member at a position angularly spaced in the direction of rotation of said other carrying member from the position where said air passages are in opposed facing relation for directing air outwardly through the air passage therein to discharge articles held against the periphery of said other carrying member.

11. An article handling apparatus comprising an upper substantially cylindrical carrier having an inner member of substantially rigid material providing orifices therein, and an outer sheet of resiliently flexible and compressible material mounted on the inner member providing pockets individually in registration with the orifices for passage of air through registered pockets and orifices and adapted to receive articles of a first group of articles, said pockets being smaller than the articles of the first group; means mounting the upper carrier for rotary movement around a predetermined axis for travel of the pockets in paths of revolution concentric to said axis from an upper article pickup station to a lower article releasing station, and return; means for supplying a first group of articles to the upper carrier at said article pickup station; means for drawing air inwardly through the orifices of the upper carrier at the pickup station and throughout the course of travel of the orifices to the releasing station; means for blowing air outwardly of the orifices of the upper carrier at the releasing station; a lower carrier having an endless flexible carrying member providing carrying and reverse sides and apertures therethrough; means mounting the lower carrier for travel successively from an article receiving station horizontally to a position subjacent to the releasing station of the upper carrier with the carrying side in opposed facing relation to the pockets of the upper carrier thence through a transition section to a position with the carrying side facing downwardly, and subsequently to a discharging station, and return, the lower carrier being adapted to carry a second group of articles on the top side thereof over said apertures past the releasing station of the upper carrier to be engaged by articles of the first group of articles; and suction means adjacent to the reverse side of the lower carrier in communication with said apertures at the position of the lower carrier where said carrying side faces downwardly to hold articles against said carrying side, the apertures of the lower carrier being smaller than the articles of the second group of articles.

12. An article handling apparatus comprising a lower carrier having an endless sheet of flexible material providing carrying and reverse surfaces and apertures therein; means for supplying dough-like material to the carrying side of the carrier; means for cutting the dough-like material into articles lying over the apertures and leaving thereby a residue of dough displaced from the apertures, said apertures being smaller than the articles thereover; means mounting the lower carrier for travel of the carrier successively along a horizontal path with said carrying surface facing upwardly into an inverted horizontal path with the carrying surface facing downwardly, to a discharging station, and return; an upper substantially cylindrical carrier having an inner substantially rigid member providing orifices therein, and an outer resiliently flexible and compressible member mounted around the inner member providing pockets in pneumatic communication with the orifices; means rotatably mounting the upper carrier on a substantially horizontal axis above the lower carrier along the path of travel thereon where the carrying surface faces upwardly for movement of pockets of the upper carrier from an upper article receiving station to a lower article releasing station facing the lower carrier; means for supplying the pellets to the pockets of the upper carrier at the receiving station, the pockets being smaller than the pellets; means drawing air inwardly through the pockets at the receiving station and throughout the path of travel of the pockets to the releasing station to draw pellets into the pockets and to carry them to the releasing station; means directing air out of the pockets at the releasing station to release the pellets, the carriers having driving interconnection for synchronous movement; powered means driving one of the carriers to bring the pockets successively into facing relation with successive cut-out articles of dough so that the pellets impinge the cut-out articles; and means adjacent to the reverse surface of the lower carrier drawing air through the apertures when the carrying surface faces downwardly to hold the cut-out articles against the lower carrier and to permit the residue to fall.

13. In an article handling apparatus, the combination of a first substantially cylindrical carrier having an inner surface, an outer sheet of resiliently flexible and compressible material, and passages extended therethrough adapted to receive articles of a first group of articles to be carried and being of such size as to prevent movement of the articles therethrough; means rotating the first carrier around a predetermined axis for travel of the passages from an article loading station to an article releasing station, and return; means adjacent to the inner surface of the carrier drawing air inwardly through the passages at the article loading station and during travel of the carrier from the loading station to the article releasing station to draw articles of said first group of articles into the passages and to carry them to the article releasing station; means adjacent to the inner surface of the carrier blowing air outwardly through the passages at the releasing station to release articles from the first carrier; a second endless carrier having a top side adapted to carry a sheet of work material thereagainst; means motivating the second carrier in a predetermined course of travel from an article receiving station past the article releasing station of the first carrier with said top side in horizontally positioned peripherally spaced facing relation to the first carrier; knives peripherally mounted on the first carrier and extended therefrom for engagement with the sheet of work material on the first carrier to divide the work material into segments, the articles carried by said first carrier being blown against said segments at the releasing station of the first carrier.

References Cited in the file of this patent
UNITED STATES PATENTS

| | | |
|---|---|---|
| 1,179,168 | Erny | Apr. 11, 1916 |
| 1,487,788 | Lombardo et al. | Mar. 25, 1924 |
| 1,539,258 | Graupner | May 26, 1925 |
| 1,763,083 | Bausman | Jan. 10, 1930 |
| 2,002,018 | Martoccio | May 21, 1935 |
| 2,152,101 | Scherer | Mar. 28, 1939 |
| 2,448,786 | Faxon | Sept. 7, 1948 |
| 2,566,712 | Zeun | Sept. 4, 1951 |
| 2,627,340 | Adams | Feb. 3, 1953 |
| 2,642,010 | Zimmer | June 16, 1953 |
| 2,657,647 | Rapisardia | Nov. 3, 1953 |
| 2,774,313 | Lombi | Dec. 18, 1956 |